United States Patent
Ko

(10) Patent No.: US 11,590,924 B1
(45) Date of Patent: Feb. 28, 2023

(54) AIRBAG APPARATUS OF MOBILITY

(71) Applicant: HYUNDAI MOBIS CO., LTD., Seoul (KR)

(72) Inventor: Byeong Mann Ko, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 17/811,133

(22) Filed: Jul. 7, 2022

(30) Foreign Application Priority Data

Aug. 5, 2021 (KR) .................. 10-2021-0103028

(51) Int. Cl.
 *B60R 21/2338* (2011.01)
 *B60R 21/207* (2006.01)

(52) U.S. Cl.
 CPC ........ *B60R 21/2338* (2013.01); *B60R 21/207* (2013.01); *B60R 2021/2074* (2013.01); *B60R 2021/23386* (2013.01)

(58) Field of Classification Search
 CPC .............. B60R 21/2338; B60R 21/207; B60R 2021/2074; B60R 2021/23386
 See application file for complete search history.

(56) References Cited

U.S. PATENT DOCUMENTS

| | | | |
|---|---|---|---|
| 2017/0136976 A1* | 5/2017 | Ohno | B60N 2/888 |
| 2018/0186325 A1* | 7/2018 | Jaradi | B60R 21/2338 |
| 2019/0054884 A1* | 2/2019 | Dry | B60R 21/2342 |
| 2020/0164828 A1* | 5/2020 | Park | B60R 21/207 |
| 2020/0391690 A1* | 12/2020 | Faruque | B60R 21/233 |
| 2022/0144204 A1* | 5/2022 | Schneider | B60N 2/803 |
| 2022/0332268 A1* | 10/2022 | Jaradi | B60R 21/264 |

FOREIGN PATENT DOCUMENTS

| | | | | |
|---|---|---|---|---|
| DE | 102014004186 A1 | * | 9/2015 | ............ B60R 21/08 |
| DE | 102016225402 A1 | * | 6/2018 | |
| EP | 3135545 A1 | * | 3/2017 | ............ B60N 2/753 |
| KR | 2010-0120400 | | 11/2010 | |
| WO | WO-2013099888 A1 | * | 7/2013 | ........... B60N 2/4235 |

OTHER PUBLICATIONS

English Language Abstract of KR 2010-0120400 published Nov. 16, 2010.

* cited by examiner

*Primary Examiner* — Drew J Brown
(74) *Attorney, Agent, or Firm* — DLA Piper LLP (US)

(57) ABSTRACT

An airbag is installed in a seat, and since an airbag cushion is deployed from an upper side of the seat toward the front of a passenger to expand so as to cover the passenger, the upper body of the passenger is stably restrained. In addition, the airbag cushion is deployed while advancing forward so as not to be interfered with by the passenger by the guide wire, and the binding force of the airbag cushion is secured by the guide wire so that the protection performance for the passenger via the airbag cushion is improved.

9 Claims, 5 Drawing Sheets

AIRBAG APPARATUS OF MOBILITY

CROSS-REFERENCE TO RELATED APPLICATION(S)

This application is based on and claims priority under 35 U.S.C. 119 to Korean Patent Application No. 10-2021-0103028, filed on Aug. 5, 2021, in the Korean Intellectual Property Office, the disclosure of which is herein incorporated by reference in its entirety.

BACKGROUND OF THE INVENTION

Field of the Invention

The disclosure relates to an airbag apparatus of a mobility configured to safely protect an occupant during a collision.

Description of the Prior Art

Technologies have been developed to secure not only the driving performance, convenience, and functionality of vehicles, but also safety of occupants.

Particularly, airbags are the most efficient means for protecting occupants from impacts among various safety devices applied to vehicles.

Such an airbag, which is a means for protecting an occupant during a vehicle collision, includes a collision sensor for sensing a vehicle collision, a controller for activating the airbag according to the result of sensing by the collision sensor, and an airbag module for activating the airbag according to a signal from the controller. Airbags are classified, according to the position in which they are installed or the target to be protected, into driver airbags, passenger seat airbags, side airbags, roof airbags, and the like.

Particularly, in line with widespread use of autonomous vehicles, seats are configured such that their position can vary, or they can rotate 360°, in order to improve the convenience of occupants.

However, airbags installed in conventional positions have limitations in connection with protecting occupants sitting on seats that change to various positions.

Moreover, conventional airbags solely protect the torso parts of occupants, and do not consider protection of the occupant's head.

In addition, there is a problem in that the structural constraining ability is degraded because occupants are constrained only by airbag tension and external tethers.

The above descriptions regarding background technologies have been made only to help understanding of the background of the disclosure, and are not to be deemed by those skilled in the art to correspond to already-known prior arts.

SUMMARY OF THE INVENTION

The disclosure has been proposed to solve the above-mentioned problems, and it an aspect of the disclosure to provide an airbag apparatus of a mobility configured such that, even if the position of a seat is varied, the occupant sitting on the seat is constrained to the seat, thereby safely protecting the occupant.

In accordance with an aspect of the disclosure, an airbag apparatus of a mobility may include: a seat including a seat back and a seat cushion; a guide wire which has one end connected to an upper side surface of the seat back and the other end connected to a side surface of the seat cushion and is configured to have a variable length; and an airbag cushion installed above the seat back and having a side end portion configured to be slidably connected to the guide wire to be deployed forwards, wherein when the airbag cushion expands, the airbag cushion is deployed along the guide wire and the length of the guide wire is elongated by the deployment force of the airbag cushion so that the airbag cushion expands in front of the passenger to cover the passenger.

A headrest may be provided in the upper portion of the seat back, the headrest being positioned higher than the passenger's head to extend to opposite sides of the passenger's head, the airbag cushion may be installed in the upper center of the headrest, and the guide wire may be connected to the side surface of the headrest.

The upper portion of the seat back may be disposed higher than the passenger's head and extend to opposite sides of the passenger's head, and the airbag cushion may be installed in the upper center of the seat back.

The seat cushion may extend to opposite sides of the lower body of the passenger so as to restrain the lower body of the passenger, and the guide wire may be connected to the side surface of the seat cushion.

The guide wires may be provided as a pair, one end thereof may be connected to the upper side surface of the seat back, and the other end thereof may be connected to the front-end side surface of the seat cushion.

A guide unit installed to be rotatable and having a through-hole formed therein may be provided at the seat cushion, the guide wire may extend through the through-hole and be connected to the seat cushion via the guide unit, and a stopper having a diameter greater than that of the through-hole may be provided on the other end of the guide wire, which has passed through the through-hole.

In a state where the airbag cushion is not expanded, the guide wire may be configured to have an initial section from one end connected to the seat back to the guide unit and an operation section from the guide unit to the other end connected to the seat cushion.

A plurality of connection rings may be provided at the side ends of the airbag cushion, and the airbag cushion may be connected to the guide wire via the connection rings.

The airbag cushion may be configured to extend along the guide wire during expansion, and a plurality of dead zones extending in a horizontal direction to be spaced apart from the side end portions may be provided from the upper side toward the lower side to be spaced apart from each other.

An airbag apparatus of a mobility having the above-mentioned structure has an airbag installed on a seat, and an airbag cushion is deployed forwards to the front of an occupant from above the seat and is expanded to cover the occupant, thereby stably constraining the upper body of the occupant.

In addition, the airbag cushion is deployed by a guide wire so as to move forwards without interfering with the occupant, and the guide wire secure the constraining force of the airbag cushion, thereby improving the occupant protecting performance through the airbag cushion.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, an airbag apparatus of a mobility according to a preferred embodiment of the disclosure will be described with reference to the accompanying drawings.

Figure 1:
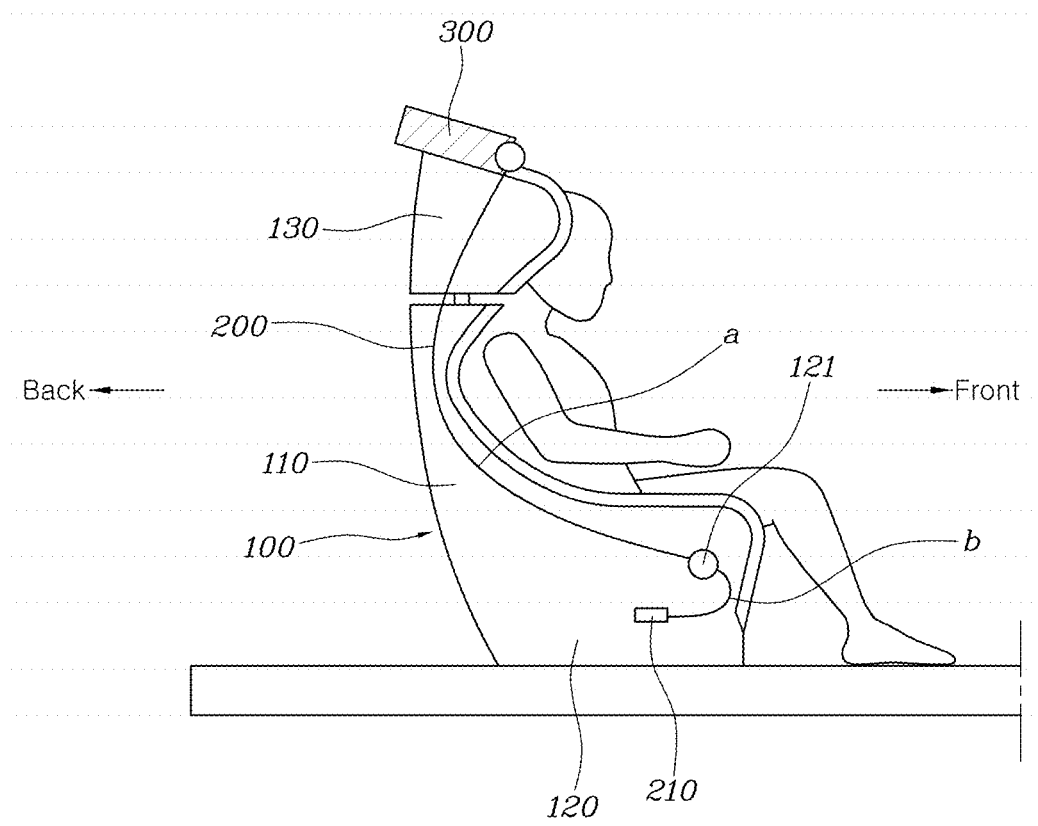
FIG. 1 is a view illustrating an airbag apparatus of a mobility according to an embodiment of the disclosure.
Figure 2:
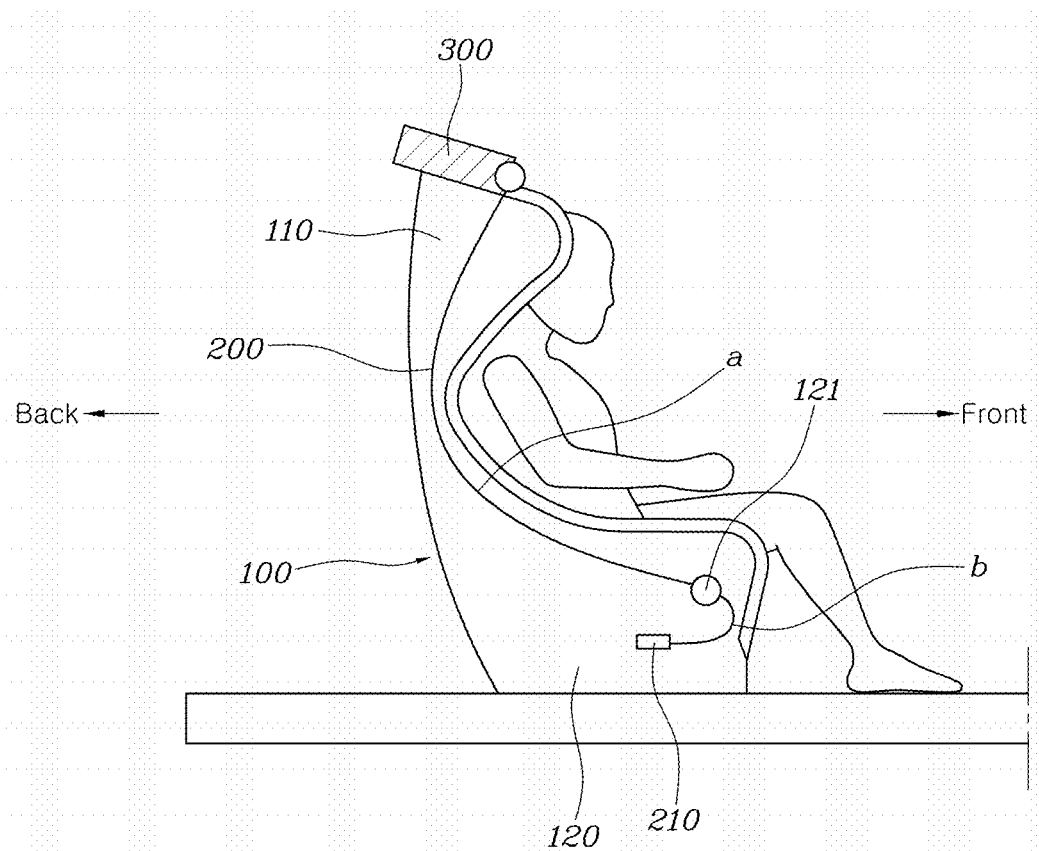
FIG. 2 is a view illustrating an airbag apparatus of a mobility according to another embodiment of the disclosure.
Figure 3:
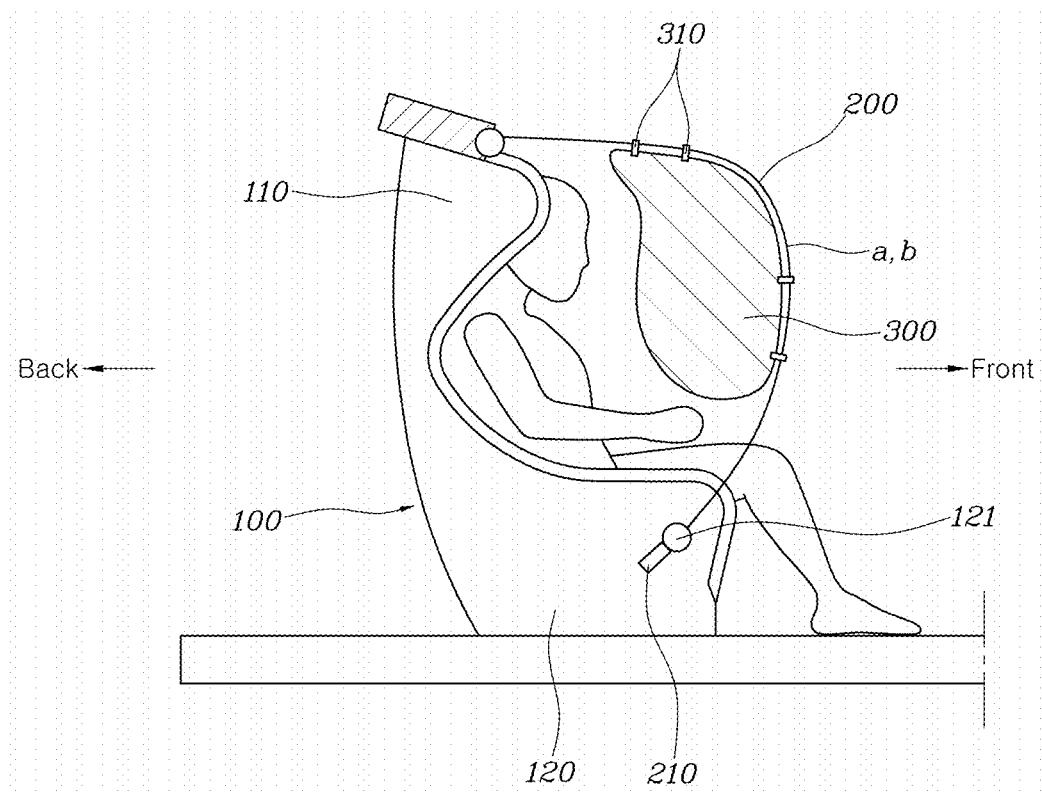
FIG. 3 is a view illustrating an operation of the airbag apparatus of the mobility illustrated in FIG. 1.
Figure 4:
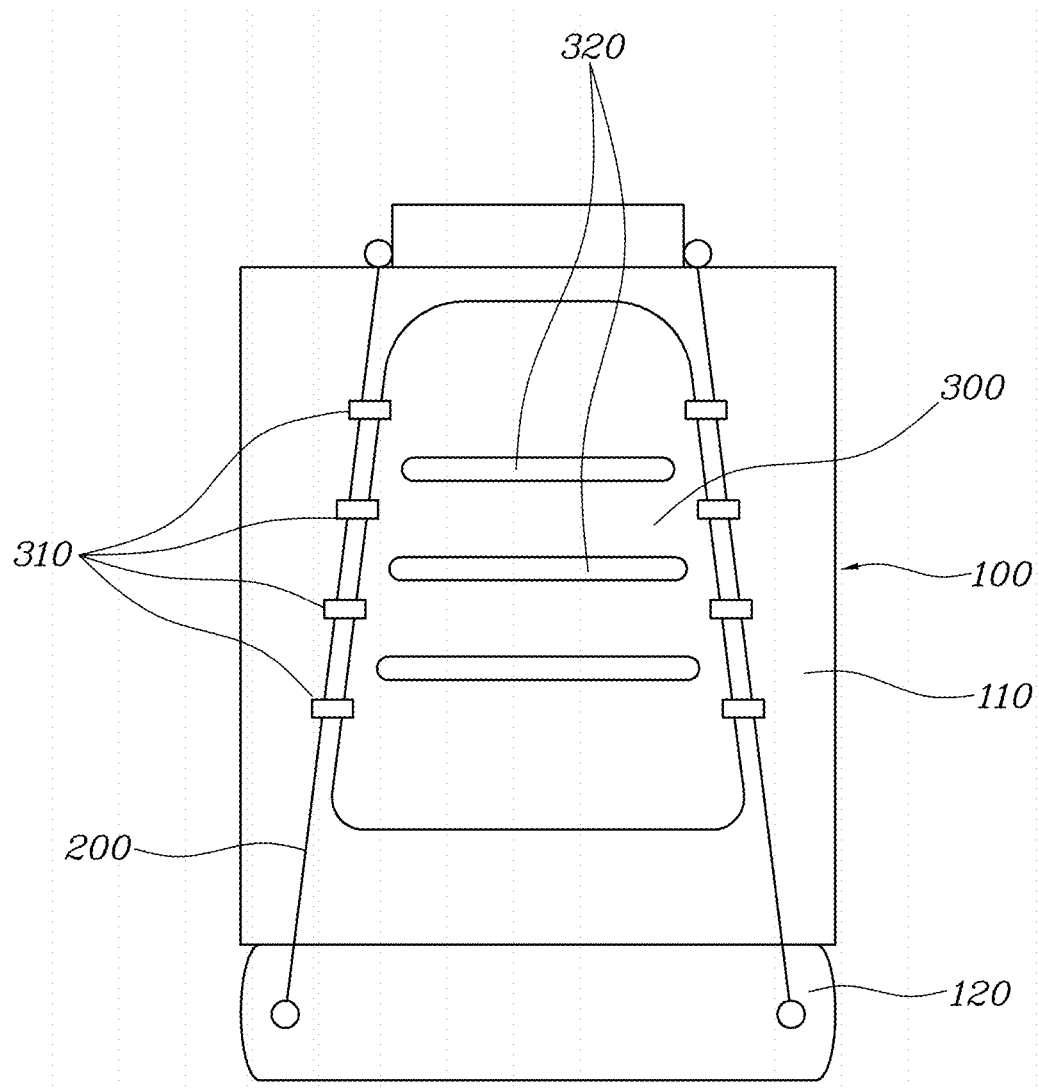
FIG. 4 is a view for describing a deployed airbag cushion of the airbag apparatus of the mobility illustrated in FIG. 1.
Figure 5:
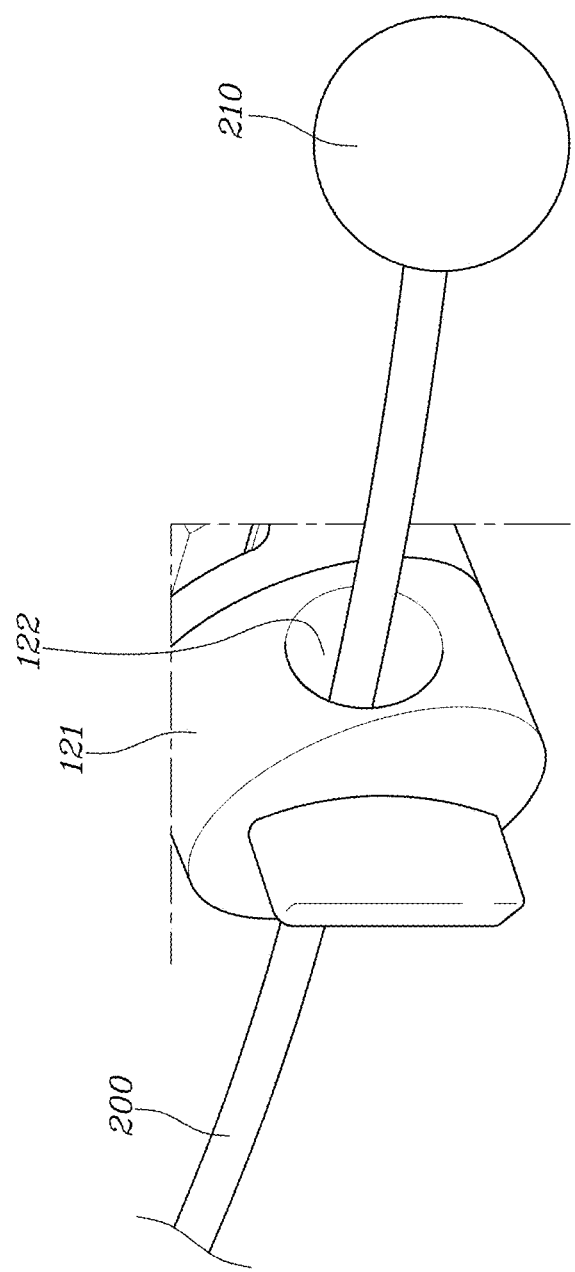
FIG. 5 is a view for describing a guide unit and a guide wire of the disclosure.

FIG. 1 is a view illustrating an airbag apparatus of a mobility according to an embodiment of the disclosure, FIG. 2 is a view illustrating an airbag apparatus of a mobility according to another embodiment of the disclosure, FIG. 3 is a view illustrating an operation of the airbag apparatus of the mobility illustrated in FIG. 1, FIG. 4 is a view for describing a deployed airbag cushion of the airbag apparatus of the mobility illustrated in FIG. 1, and FIG. 5 is a view for describing a guide unit and a guide wire of the disclosure.

As illustrated in FIG. 1 to FIG. 4, an airbag apparatus of a mobility according to the disclosure includes: a seat 100 including a seat back 110 and a seat cushion 120; a guide wire 200 configured to have one end connected to an upper side surface of the seat back 110 and the other end connected to a side surface of the seat cushion 120 and to have a variable length; and an airbag cushion 300 installed above the seat back 110 and having a side end portion slidably connected to the guide wire 200 to be deployed forwards.

The seat 100 of the disclosure may include the seat back 110 and the seat cushion 120 and may be configured to be moved or rotated by 360° in the interior of the mobility.

The guide wire 200 and the airbag cushion 300 are provided at the seat 100 described above.

Here, the guide wire 200 has one end connected to an upper side surface of the seat back 110 and the other end connected to a side surface of the seat cushion 120 so as not to be interfered with by a passenger sitting in the seat 100.

In addition, the guide wire 200 is configured to have a variable length. That is, in the guide wire 200, the length between the position at which the guide wire is connected to the seat back 110 and the position at which the guide wire is connected to the seat cushion 120 is variable, and the guide wire may be configured to be elastically changed or may change the length to have a spare length thereof.

Particularly, the guide wire 200 is configured to have a limited maximally-increased distance when the length of the guide wire is increased and limits the deployment position of the airbag cushion 300 while guiding the deployment of the airbag cushion 300 so as to secure the binding force of the airbag cushion 300.

Meanwhile, the air bag cushion 300 is installed above the seat back 110 and the side end portion thereof is slidably connected to the guide wire 200. The airbag cushion 300 described above may be supplied with the gas of the inflator to be expanded while being accommodated in the housing, and the deployment structure of the airbag cushion 300 is omitted because it is a conventional technique.

However, the airbag cushion 300 is installed to be deployed forwards. Here, the front which is the deployment direction of the airbag cushion 300 is the front of the passenger sitting in the seat 100, and the airbag cushion 300 expands in front of the passenger so as to cover the passenger when being deployed.

Accordingly, in the disclosure, when the airbag cushion expands, the airbag cushion 300 may be deployed along the guide wire 200 and the length of the guide wire 200 may be elongated by the deployment force of the airbag cushion 300 so that the airbag cushion 300 expands in front of the passenger to cover the passenger.

That is, as shown in FIG. 3, as the guide wire 200 is normally positioned on the side surface of the seat 100, it does not interfere with the passenger.

Here, as shown in FIG. 3, the airbag cushion 300 expands when a vehicle collision occurs, and while the deployment force of the airbag cushion 300 causes the guide wire 200 to be moved forward, the length thereof is extended. In this way, as the airbag cushion 300 is deployed along the guide wire 200, the airbag cushion 300 may be expanded to cover the passenger in front of the passenger and may safely restrain and protect the passenger.

When the above-mentioned present disclosure is specifically described, as illustrated in FIG. 1, a headrest 130 is provided in the upper portion of the seat back 110, the headrest being positioned higher than the passenger's head to extend to opposite sides of the passenger's head, the airbag cushion 300 is installed in the upper center of the headrest 130, and the guide wire 200 is connected to the side surface of the headrest 130.

Likewise, the headrest 130 is formed higher than the passenger's head and extends to opposite sides of the passenger's head, and the airbag cushion 300 is installed in the center of the headrest 130.

Likewise, the headrest 130 is disposed higher than the passenger's head, and as the headrest 130 is positioned higher than the passenger's head, the airbag cushion 300 does not interfere with the passenger's head when the airbag cushion 300 installed on the headrest 130 is deployed.

In addition, the headrest 130 is formed to extend to opposite sides of the passenger's head and is configured to block the line of sight on opposite sides of the passenger's head, and by restraining the passenger's head in the event of a collision, the stability of the passenger's head is ensured.

Accordingly, one end of the guide wire 200 is installed on the side surface of the headrest 130 so as not to interfere with the passenger.

In addition, since the airbag cushion 300 is provided in the upper center of the headrest 130, when the airbag cushion 300 is deployed, it may be deployed in the center of the passenger without being biased to either side with respect to the passenger.

Meanwhile, as illustrated in FIG. 2, the seat back 110 may be formed such that the upper portion thereof is higher than the passenger's head and may extend to opposite sides of the passenger's head, and the airbag cushion 300 may be installed in the upper center of the seat back 110.

Likewise, the seat back 110 is disposed higher than the passenger's head and extends to opposite sides of the passenger's head, and the airbag cushion 300 is installed in the upper center of the seat back 110.

Likewise, the seat back 110 is disposed higher than the passenger's head, and as the upper portion of the seat back 110 is positioned higher than the passenger's head, the airbag cushion 300 does not interfere with the passenger's head when the airbag cushion 300 installed in the seat back 110 is deployed.

In addition, the upper portion of the seat back 110 is formed to extend to opposite sides of the passenger's head and is configured to block the line of sight on opposite sides of the passenger's head, and by restraining the passenger's head in the event of a collision, the stability of the passenger's head is secured.

Accordingly, one end of the guide wire 200 is installed on the side surface of the upper portion of the seat back 110 so as not to interfere with the passenger.

In addition, as the airbag cushion 300 is installed in the upper center of the seat back 110, when the airbag cushion 300 is deployed, it may be deployed in the center of the passenger without being biased to either side with respect to the passenger.

Meanwhile, as shown in FIG. 1, the seat cushion 120 is formed to extend to opposite sides of the lower body of the passenger so as to restrain the lower body of the passenger, and the guide wire 200 is connected to the side surface of the seat cushion 120.

Likewise, since opposite side portions of the seat cushion 120 are formed to extend so as to surround the lower body of the passenger, the lower body of the passenger sitting on the seat cushion 120 is fixed so as to secure the behavioral stability of the lower body. Furthermore, since the guide wire 200 is connected to the opposite side portions of the seat cushion 120, when the airbag cushion 300 is deployed, the guide wire 200 is stably moved forwards.

Meanwhile, the guide wires 200 are provided as a pair, one end thereof is connected to the upper side surface of the seat back 110, and the other end thereof is connected to the front-end side surface of the seat cushion 120.

Likewise, since the guide wires 200 are provided as a pair and are connected to opposite upper side surfaces of the seat back 110 and opposite side surfaces of the front end portion of the seat cushion 120, respectively, opposite side ends of the airbag cushion 300 may be connected to the pair of guide wires 200 to be stably deployed along the guide wires 200.

In addition, since one end of the guide wire 200 is connected to the upper side surface of the seat back 110 and the other end thereof is connected to the side surface of the front-end portion of the seat cushion 120, a distance forwardly separated towards the front of the passenger is secured when the guide wire 200 is elongated by the deployment force of the airbag cushion 300.

Accordingly, since the airbag cushion 300 deployed along the guide wire 200 is deployed so as to be separated towards the front of the passenger, it may be safely deployed without colliding with the passenger during the process of deploying the airbag cushion 300.

Meanwhile, a guide unit 121 installed to be rotatable and having a through-hole 122 formed therein is provided at the seat cushion 120, the guide wire 200 extends through the through-hole 122 and is connected to the seat cushion 120 via the guide unit 121, and a stopper 210 having a diameter greater than that of the through-hole 122 is provided on the other end of the guide wire, which has passed through the through-hole 122.

In addition, in a state where the airbag cushion 300 is not expanded, the guide wire 200 is formed to have an initial section a from one end connected to the seat back 110 to the guide unit 121 and an operation section b from the guide unit 121 to the other end connected to the seat cushion 120.

That is, as illustrated in FIG. 1 and FIG. 5, the guide unit 121 is rotatably installed at the seat cushion 120 and the through-hole 122 through which the guide wire 200 extends is disposed at the guide unit 121. Accordingly, the guide wire 200 is connected to the seat cushion 120 via the guide unit 121.

In addition, the guide wire 200 is configured to have the initial section a and the operation section b. That is, in a state where the airbag cushion 300 is not expanded, the guide wire 200 is divided into the initial section a and the operation section b with reference to the guide unit 121.

Here, when the airbag cushion 300 is expanded, the guide wire 200 is moved by the deployment force of the airbag cushion 300 so that the initial section a and the operating section b are located on one side of the guide unit 121. That is, since the length of the guide wire 200 increases from the position connected to the seat back 110 to the position connected to the seat cushion 120, the airbag cushion 300 may be stably deployed along the guide wire 200.

In addition, since the stopper 210 having a diameter greater than that of the through-hole 122 is provided on the other end of the guide wire 200, the other end of the guide wire 200 is restricted from being detached from the guide unit 121. Accordingly, since the guide wire 200 is elongated when the airbag cushion 300 is deployed and the elongated length thereof is restricted, the binding force of the airbag cushion 300 for the passenger is secured.

Meanwhile, a plurality of connection rings 310 are provided at the side ends of the airbag cushion 300 so that the airbag cushion 300 is connected to the guide wire 200 via the connecting ring 310.

Accordingly, the airbag cushion 300 may be deployed along the guide wire 200 since the plurality of connecting rings 310 are slid along the guide wire 200 during deployment.

In addition, the airbag cushion 300 is configured to extend along the guide wire 200 during expansion, and a plurality of dead zones 320 extending horizontally to be spaced apart from the side end portions are provided from the upper side toward the lower side to be spaced apart from each other.

Likewise, since the plurality of dead zones 320 are provided in the airbag cushion 300, a deployment speed of the airbag cushion 300 is improved, and as the airbag cushion 300 is bent at the position where the respective dead zones 320 are provided, not only is it smooth to deploy along the guide wire 200, but it can also be transformed into a shape that surrounds the passenger.

In the airbag apparatus of the mobility, which has the structure as described above, the airbag apparatus is provided at the seat 100, and since the airbag cushion 300 deploys from the upper side of the seat 100 toward the front of the passenger and expands so as to cover the passenger, the upper body of the passenger is stably restrained.

In addition, the airbag cushion 300 is deployed while advancing forward so as not to be interfered with by the passenger by the guide wire 200, the binding force of the airbag cushion 300 is secured by the guide wire 200 so that the protection performance for the passenger via the airbag cushion 300 is improved.

Although the disclosure has been illustrated and described with reference to specific embodiments, it will be obvious to those skilled in the art that the disclosure can be variously improved and modified without departing from the spirit of the disclosure provided by the following claims.

What is claimed is:
1. An airbag apparatus, the apparatus comprising:
a seat including a seat back and a seat cushion;
a guide wire having one end connected to an upper side surface of the seat back and another end connected to a side surface of the seat cushion and being configured to have a variable length; and an airbag cushion installed above the seat back and having a side end portion configured to be slidably connected to the guide wire to be deployed forwards, wherein when the airbag cushion expands, the airbag cushion is deployed along the guide wire and a length of the guide wire is elongated by a deployment force of the airbag cushion so that the airbag cushion expands in front of the passenger to cover the passenger.

2. The airbag apparatus of claim 1, wherein a headrest is provided in an upper portion of the seat back, the headrest being positioned higher than the passenger's head and to extend to opposite sides of the passenger's head, and the airbag cushion is installed in an upper center of the headrest and the guide wire is connected to the side surface of the headrest.

3. The airbag apparatus of claim 1, wherein an upper portion of the seat back is disposed higher than the passenger's head and extends to opposite sides of the passenger's head and the airbag cushion is installed in an upper center of the seat back.

4. The airbag apparatus of claim 1, wherein the seat cushion extends to opposite sides of a lower body of the passenger so as to restrain the lower body of the passenger, and the guide wire is connected to the side surface of the seat cushion.

5. The airbag apparatus of claim 1, wherein the guide wire is provided as a pair of guide wires, one end of the pair being connected to the upper side surface of the seat back, and another end of the pair being connected to the front-end side surface of the seat cushion.

6. The airbag apparatus of claim 1, further comprising:

a guide unit provided at the seat cushion and configured to be rotatable and having a through-hole formed therein, wherein the guide wire extends through the through-hole and is connected to the seat cushion via the guide unit, and a stopper having a diameter greater than that of the through-hole is provided on the another end of the guide wire, which has passed through the through-hole.

7. The airbag apparatus of claim 6, wherein in a state where the airbag cushion is not expanded, the guide wire is configured to have an initial section from one end connected to the seat back to the guide unit and an operation section from the guide unit to the other end connected to the seat cushion.

8. The airbag apparatus of claim 1, wherein a plurality of connection rings are provided at the side ends of the airbag cushion so that the airbag cushion is connected to the guide wire via the connection rings.

9. The airbag apparatus of claim 1, wherein the airbag cushion is configured to extend along the guide wire during expansion, and a plurality of dead zones extending in a horizontal direction to be spaced apart from the side end portions are provided from the upper side toward a lower side to be spaced apart from each other.

* * * * *